United States Patent
Price et al.

(10) Patent No.: US 11,061,987 B1
(45) Date of Patent: Jul. 13, 2021

(54) MANAGING HYPERLINKS

(71) Applicant: International Business Machines Corporation, Armonk, NY (US)

(72) Inventors: Dana L. Price, Surf City, NC (US); Heather Saunders, Raleigh, NC (US); Kelly Camus, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/813,395

(22) Filed: Mar. 9, 2020

(51) Int. Cl.
*G06F 16/955* (2019.01)
*G06F 40/20* (2020.01)
*G06F 16/953* (2019.01)
*G06F 16/957* (2019.01)

(52) U.S. Cl.
CPC ........ *G06F 16/9558* (2019.01); *G06F 16/953* (2019.01); *G06F 16/957* (2019.01); *G06F 40/20* (2020.01)

(58) Field of Classification Search
CPC .... G06F 16/9558; G06F 40/20; G06F 16/957; G06F 16/953
USPC ........................................................ 715/205
See application file for complete search history.

(56) References Cited

U.S. PATENT DOCUMENTS

| | | | | |
|---|---|---|---|---|
| 6,452,597 | B1 * | 9/2002 | Goldberg | G09G 5/00 340/7.55 |
| 6,670,968 | B1 * | 12/2003 | Schilit | G06F 16/957 715/760 |
| 8,245,142 | B2 * | 8/2012 | Mizrachi | H04M 1/72561 715/744 |
| 8,898,560 | B1 * | 11/2014 | Kent | G06F 16/9577 715/234 |
| 8,959,431 | B2 | 2/2015 | Bunker | |
| 9,047,259 | B1 * | 6/2015 | Ho | G06F 40/134 |
| 10,210,142 | B1 * | 2/2019 | Jain | G06F 16/94 |
| 10,853,434 | B2 * | 12/2020 | Prelovac | G06F 3/04855 |
| 2002/0032699 | A1 * | 3/2002 | Edwards | G06F 16/957 715/207 |
| 2003/0100320 | A1 * | 5/2003 | Ranjan | G06F 16/9566 455/466 |
| 2008/0235608 | A1 * | 9/2008 | Prabhu | G06F 16/9535 715/765 |
| 2011/0231782 | A1 * | 9/2011 | Rohrabaugh | G06F 9/451 715/760 |

(Continued)

OTHER PUBLICATIONS

"Forums: show truncated text by hovering only on ellipsis," CSS Tricks, accessed Jan. 8, 2020, 2 pages. <https://css-tricks.com/forums/topic/show-truncated-text-by-hovering-only-on-ellipsis/>.

(Continued)

*Primary Examiner* — Michael Roswell
(74) *Attorney, Agent, or Firm* — Brian D. Welle (57) ABSTRACT

A fragment of title text of a hyperlink to a source is determined to be designated to be displayed in a graphical portion of a graphical user interface (GUI). The graphical portion is allocated for the title text of the hyperlink. A threshold amount of unutilized space on the GUI adjacent the graphical portion is identified. Additional text of the title text is gathered from the source in response to both identifying that the fragment is designated to be displayed and identifying the threshold amount of unutilized space. The GUI is caused to display the additional text of the title in the unutilized space adjacent the graphical portion.

20 Claims, 3 Drawing Sheets

(56) References Cited

U.S. PATENT DOCUMENTS

2011/0264992 A1* 10/2011 Vishria .............. G06F 16/9566
715/208
2013/0097482 A1* 4/2013 Marantz .............. G06F 16/9577
715/234

OTHER PUBLICATIONS

"Simple link preview by Lecron," Firefox Browser Add-Ons, accessed Jan. 8, 2019, 2 pages. <https://addons.mozilla.org/en-US/firefox/addon/simple-link-preview/#&gid=1&pid=1>.
"Truncating and revealing text—The Show More and Read More patterns," Just Markup, Jan. 12, 2017, 5 pages. <https://justmarkup.com/articles/2017-01-12-truncating-and-revealing-text-the-show-more-and-read-more-patterns/#header>.

* cited by examiner

MANAGING HYPERLINKS

BACKGROUND

As the size of computer networks and the size of software products grow, the use of hyperlinks to navigate through these networks and products grows with them. Hyperlinks may be a phrase, icon, symbol, or the like. When clicked on or otherwise selected, a hyperlink enables a user to navigate to a different portion of the network or software product, such as a hyperlink from one webpage that navigates to a different webpage. When a user browses online using an internet browser to a website, this website may provide these hyperlinks to the internet browser which enables the display of these hyperlinks according to display settings designated by the website. For example, a search engine may provide a list of hyperlinks for a plurality of search results along with display settings that indicate how these search results should be displayed, upon which the internet browser may display the hyperlinks for the sources within a graphical user interface of the internet browser. The final display of the search results as viewed by the user may therein change to varying degrees based on the display settings of a computer, a magnification level relating to the text, a size of the graphical user interface (which may be as big as the monitor, such that a larger monitor enables a relatively larger display), or other such variables.

SUMMARY

Aspects of the present disclosure relate to a method, system, and computer program product relating to managing hyperlinks. For example, the method includes determining that a fragment of title text of a hyperlink to a source is designated to be displayed in a graphical portion of a graphical user interface (GUI). The graphical portion is allocated for the (fragment of) title text of the hyperlink. The method also includes identifying a threshold amount of unutilized space on the GUI adjacent the graphical portion. The method also includes gathering additional text of the title text from the source in response to both identifying that the fragment is designated to be displayed and identifying the threshold amount of unutilized space. The method also includes causing the GUI to display the additional text of the title in the unutilized space adjacent the graphical portion. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing hyperlinks, while more particular aspects relate to identifying that a truncated portion (e.g., a fragment) of a hyperlink title is designated for display in a graphical user interface (GUI), gathering additional title text from the source of that hyperlink, and displaying the additional text adjacent the fragment in identified unutilized space of the GUI. While the present disclosure is not necessarily limited to such applications, various aspects of the disclosure may be appreciated through a discussion of various examples using this context.

In conventional computing systems, when navigating or "browsing" online, a user may open an internet browser to browse different websites. For example, a user may open an internet browser to search for a topic using a search engine. The user may provide a query to the search engine via a GUI of the internet browser. The search engine may use searching algorithms to identify sources that relate to a query, and may identify titles of and hyperlinks to these sources. The search engine may then provide these titles and hyperlinks to the internet browser so that the user can navigate to these sources. In other examples, the search engine may provide from the sources information other than titles and hyperlinks, such as screen shots of the source, a paragraph or sentence from the source that relates to the query, or the like.

The search engine may also graphically define how the search results are to be displayed on the GUI of the internet browser. This may include allocating graphical portions of the GUI to some or all elements of the search results. For example, the search engine may define a pixel area of a graphical portion for the search bar, a pixel area of respective graphical portions for each source (e.g., where each respective graphical portion includes at least a title and hyperlink for the respective source), a pixel area of a graphical portion for an advertisement, or the like. The search engine may also define relative locations of these graphical portions (e.g., the search bar is a predetermined amount of pixels from the top of the GUI, the search results are a predetermined amount of pixels down from the search bar and a predetermined amount of pixels away from a left edge of the GUI, the advertisement is a predetermined amount of pixels from a right edge of the GUI). In conventional systems, the search engine may determine how much text and/or information can fit within the allocated graphical portion for each source, and may only provide this amount of text and/or information to the internet browser. By only sending the information that the search engine determines will fit, the search engine can minimize an amount of data transmission (e.g., such that it may be advantageous for the search engine to thusly minimize the amount that is sent and only send that amount that fits within each respective graphical portion). The internet browser may then display each of these entities within their respective graphical portions within a GUI of the internet browser according to these received instructions.

Given that conventional search engines (or other applications that return hyperlinks from remote sources) may thusly look to only send data that can fit within predetermined allocated graphical portions, in some examples, a search engine may return a fragmented sentence or title for display on the GUI. For example, a title may contain more text than can fit within the allocated title graphical portion, such that the search engine "truncates" the title until only a fragment of the title is sent to the internet browser for display. Depending upon the title, it may be difficult or impossible for a user to understand what is covered by the source from the fragment of the title that is displayed. Further, given the proliferation of wide-screen monitors, in many examples there may be space that is not utilized by the GUI (e.g., the GUI is not currently using those pixels to display information) that could be used to display the text. However, given that a conventional search engine only sends fragments to minimize data transfer, it may be difficult or impossible for a conventional internet browser to utilize this unutilized space to provide more information to increase the utility of the title fragment, even were the internet browser configured to determine that the title is a fragment (which a conventional internet browser is not configured to do). As such, conventional solutions have a technical problem as a result of an insufficient amount of information being passed between a conventional data retrieval agent (e.g., the search engine) and a conventional data display agent (e.g., the internet browser) such that neither is configured to ensure or verify that the data is displayed in a manner sufficient to describe each source within the actual realized space of a GUI that is available for such description.

Aspects of this disclosure relate to solving or mitigating such technical problems. For example, aspects of this disclosure relate to a method and system for identifying title fragments, identifying unutilized space adjacent these fragments, gathering additional text from a source, and then displaying the additional text in the unutilized space. A plugin is predominantly described herein as executing these operations. This plugin may be installed on the user computer and integrated into the internet browser. The plugin may execute these operations without requiring involvement of the web developer that developed the search engine and/or the developer that developed the internet browser. However, in other examples, agents other than the plugin may execute some or all of these operations. For example, other agents described herein may execute some or all of these operations, such that the internet browser is configured to execute these operations without the help from a plugin, or a software-as-a-service application provides these services, or the like.

Figure 1A:
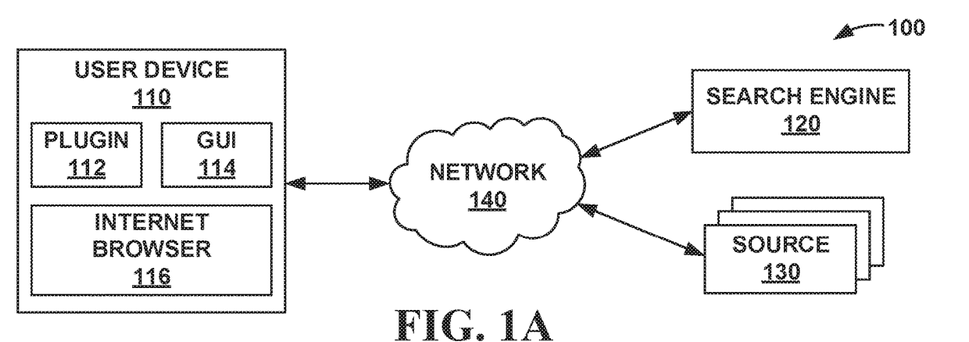
FIG. 1A depicts a conceptual diagram of an example environment in which a plugin may manage hyperlinks provided by a search engine to data from a plurality of sources as viewed on an example graphical user interface (GUI) on a user device.

FIG. 1A depicts environment 100 in which plugin 112 manages hyperlinks as provided by search engine 120 to a plurality of sources 130. As depicted in FIG. 1A, environment 100 includes user device 110, which is a computing device (such as system 200 of FIG. 2) that includes a processor communicatively coupled to a memory. User devices 110 may include computing devices such as desktop computers, laptops, mobile phones, tablets, or the like. Once plugin 112 is installed on user device 110, memory of user device 110 may include instructions of plugin 112 that, when executed by a processor of user device 110, causes user device 110 to execute one or more operations attributed to plugin 112 as described below.

Users may use user device 110 to navigate online using services such as those provided by search engine 120. For example, users may use search engine 120 to view or otherwise utilize data hosted on sources 130. Search engine 120 may be hosted by a network of servers or the like, while sources 130 may include online websites, articles, databases, or the like as hosted on servers. Though a single search engine 120 is depicted in FIG. 1A for purposes of illustration, user device 110 may interact with any number of search engines 120. Further, in other examples, user device 110 may receive titles and hyperlinks (and therein identify fragments and provide additional text as described herein) from applications other than a search engine. For example, user device 110 may receive titles and hyperlinks to sources 130 from a repository of sources 130, or from a news website (e.g., where titles are headlines for articles that are similar to the news story currently being presented), a sports website, a social media website, or any other online website or online application that provides hyperlinks and titles to remote sources 130 as consistent with this disclosure.

Search engine 120 may be configured to identify and retrieve relevant sources 130 in response to a query from a user as provided via user device 110. Once respective sources 130 are identified, search engine 120 may provide titles and hyperlinks of each of these identified sources 130 to user device 110. Internet browser 116 of user device 110 may display these titles and hyperlinks as provided by search engine 120 on graphical user interface 114 (GUI 114) of user device 110. Internet browser 116 may be a software application configured to enable a user to browse the Internet. GUI 114 may be presented on one or more displays of user device 110 as controlled by internet browser 116.

User devices 110 may access search engine 120 and/or sources 130 over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., user device 110, search engine 120, and/or sources 130) may receive messages and/or instructions from and/or through network 140 and forward the messages and/or instructions for storage or execution or the like to a respective memory or processor of the respective computing/processing device. Though network 140 is depicted as a single entity in FIG. 1A for purposes of illustration, in other examples network 140 may include a plurality of private and/or public networks over which plugin 112 may manage hyperlinks.

As discussed herein, search engine 120 may provide titles and hyperlinks for respective sources 130 to internet browser 116. In some examples, search engine 120 may also provide images, summaries, or the like from sources 130 to internet browser 116 for internet browser 116 to display within GUI 114. Further, as discussed herein, search engine 120 may define graphical portions for each element that internet browser 116 is to display. Search engine 120 may define graphical portions by an area of the graphical portion (e.g., as defined by pixel heights and pixel widths within the graphical portion), a relative space from each graphical portion to adjacent edges, and/or a relative space between one graphical portion and one or more other graphical portions.

Figure 1B:
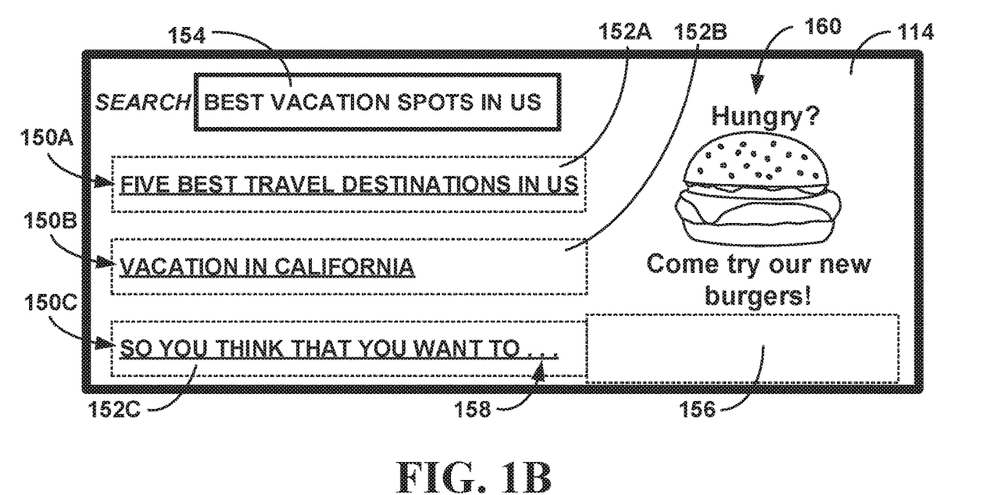
FIG. 1B depicts example hyperlinks as designated for display by a search engine on the GUI of FIG. 1A where one hyperlink title is a fragment.

For example, FIG. 1B depicts GUI 114 as designated for display by search engine 120. GUI 114 includes titles 150A-150C (collectively, "titles 150"), which as depicted are also hyperlinks. Each of titles 150 is within a respective graphical portion 152A-152C (collectively, "graphical portions 152"). GUI 114 also includes search bar 154 with current search query, "best vacation spots in US." A user may have sent this query to search engine 120 via internet browser 116. Further, GUI 114 includes advertisement 160.

Figure 1C:
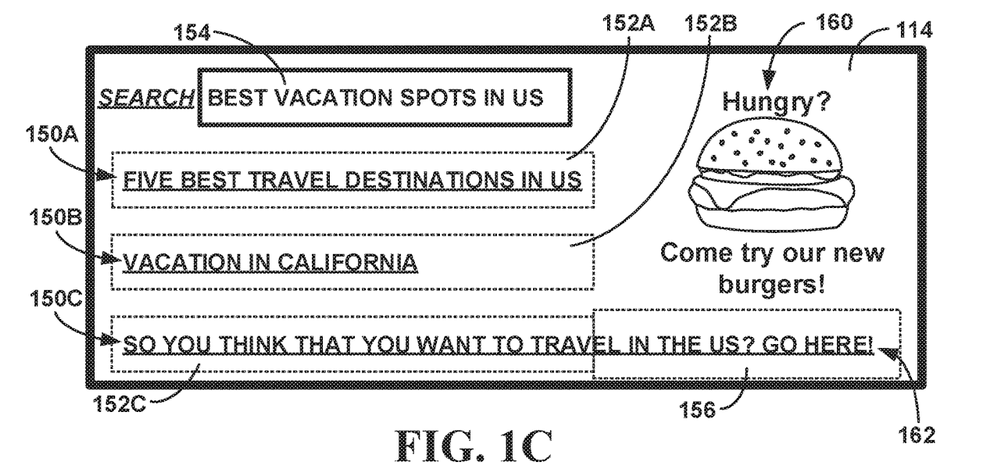
FIG. 1C depicts example hyperlinks as displayed on the example GUI of FIG. 1A where additional text for the fragmented hyperlink title is displayed next to the allocated portion of the GUI in unutilized space of the GUI of FIG. 1A.

As discussed above, search engine 120 defines relative graphical portions for each element, including spacing therebetween. Internet browser 116 may cause a display to generate GUI 114 per the specifications of search engine 120 with minimal or no change, such that internet browser 116 is not configured to define this graphical representation, but rather places and causes each element to be depicted according to specifications from search engine 120. Further, search engine 120 defines a space between graphical portions 152 and each other, and/or between graphical portions 152 and edges of GUI 114. For example, search engine 120 may define a distance between search bar 154 and a "top" and "left" edge of GUI 114 as depicted in FIG. 1B, and search engine 120 may define a distance between first title 150A and the left edge as well as between first title 150A and search bar 154, and search engine 120 may define a distance between advertisement 160 and a top of GUI 114 and a right edge of GUI 114, etc. In some examples, search engine 120 may only set a minimum distance and not a maximum distance between some components. For example, search engine 120 may set a minimum distance between advertisement 160 and graphical portions 152 so that each may not overlap, but search engine may not set a maximum distance between advertisement 160 and graphical portions 152. In such examples, when GUI 114 is depicted on some widescreen monitors, advertisement 160 may be on a far right side of a monitor and titles 150 may be on a far left side of the monitor such that the full display defines a relatively large amount of unutilized space therebetween (e.g., five or ten times the amount of unutilized space than is depicted in FIGS. 1B and 1C).

Plugin 112 is configured to detect that third title 150C is a fragment. In some examples, plugin 112 detects that third title 150C is a fragment via a textual or graphical identifier, such as ellipsis 158 at an end of third title 150C. Other examples of textual or graphical identifiers can include an arrow, an asterisk, or the like which are predetermined to represent that the title has been truncated. In other examples, plugin 112 is configured to utilize natural language processing (NLP) techniques such as those described herein to identify that third title 150C is a fragment (for example, using NLP techniques plugin 112 may identify that third title 150C does not relate to a topic with a threshold amount of confidence). Search engine 120 may send third title 150C to internet browser 116 as a fragment in order to get third title 150C to fit within respective allocated graphical portion 152C. As such, internet browser 116 may not have any additional information as to what a full version of third title 150C may be outside of the fragment that was sent by search engine 120.

Being as third title 150C is a fragment, it may be difficult or impossible for a user to analyze or understand third title 150C as responding to a provided search query. For example, it may be difficult to identify a subject matter which third title 150C "So you think you want to . . ." would relate to. As such, if such a fragmented third title 150C were provided to a user via GUI 114 (e.g., within a conventional computing system), a user may have to navigate to the respective source 130 of third title 150C to analyze and weigh the merits of third title 150C, therein consuming time and computing bandwidth in the process (e.g., the bandwidth to graphically process the respective source 130 and keep source 130 page fully loaded at all times, depending upon the settings of internet browser 116).

Upon determining that third title 150C is a fragment, plugin 112 may analyze GUI 114 as designated for display by search engine 120. Specifically, plugin 112 may identify whether any unutilized sections of GUI 114 exist, specifically identifying if any unutilized sections are immediately adjacent third title 150C, subsequently identifying unutilized space 156. Plugin 112 may determine that unutilized space 156 is not used to provide information as a result of a uniformity of pixel color as designated by search engine (e.g., where all of the pixels of unutilized space 156 are essentially a single color, or depict a single background pattern). In other examples, plugin 112 may determine that unutilized space 156 is not designated to provide information as a result of metadata or an identifier related to unutilized space 156 (e.g., where unutilized space 156 is designated as "background" by search engine).

In response to determining that third title 150C is a fragment adjacent unutilized space 156, plugin 112 navigates to source 130 of third title 150C. Plugin 112 may navigate to source 130 of third title 150C via the hyperlink provided by search engine 120. Once plugin 112 arrives via network 140 to the respective source 130, plugin 112 may search source 130 for third title 150C to identify additional text 162 of third title 150C.

In some examples, plugin 112 may gather a full version of third title 150C from source 130, such that additional text 162 "completes" third title 150C. Plugin 112 may gather the full version of third title 150 in response to identifying that the full version fits within the combined space of graphical portion 150C and unutilized space 156. In other examples, plugin 112 may only gather as much of third title 150C as can fit in unutilized space 156, such that additional text 162, when combined with third title 150C, is still less than the full title of source 130. In certain examples, where a full version of title 150C of source 130 does not fit in graphical portion 152C and unutilized space 156, plugin 112 may utilize NLP techniques to generate and/or identify a portion of the full title of source 130 that completes the fragment.

This act of finishing or completing the fragment may result in additional text 162 that was not present as a consecutive string of characters within source 130. Rather, some characters may be removed, changed, or added to generate additional text 162. For example, a full title of the respective source 130 may be "So you think that you want to travel in North America? Perhaps Canada, perhaps Mexico, perhaps the US, perhaps the Caribbean? For each of those places, we'll help you know what to do! You'll be confident that you can say, 'Let's go here!'" As such, even with unutilized space 156, it may be impossible to fit this full text into GUI 114. Similarly, in some examples plugin 112 may be configured to change some text of the original title 150 using NLP techniques to fit within the respective graphical portion 152 and unutilized space 156, such, e.g. changing "North America" to "US" to fit within a relatively smaller area. As such, plugin 114 may use NLP techniques to condense the full title into a portion that turns fragment of third title 150C into a full phrase and relates and responds to the search query.

Once gathered, as depicted in FIG. 1C, plugin 112 may cause GUI 114 to depict additional text 162 of third title 150C in unutilized space 156 adjacent third title 150C. Plugin 112 may cause GUI 114 to depict additional text 162 in-line with third title 150C and with the same font type and font size and the like, such that a user may not detect that plugin 112 has inserted additional text 162. In some examples, where third title 150C is a hyperlink that leads to the respective source 130, plugin 112 may cause this hyperlink to extend to additional text 162 such that a user may click on additional text 162 to get to the respective source 130.

In some examples, plugin 114 may identify unutilized space 156 of GUI 114 at a location that is not adjacent the fragment (not depicted), in response to which plugin 114 may identify one or more elements of GUI 114 that may be moved to position unutilized space 156 adjacent third title 150C. For example, plugin 114 may identify that advertisement 160 is adjacent third title 150C (e.g., such that advertisement 160 is where unutilized space 156 is as depicted in FIG. 1C), while there is an unutilized portion of GUI 114 adjacent first title 150A. As such, plugin 114 may determine to move advertisement 160 up to a location adjacent first title 150A (e.g., a location depicted in FIGS. 1B and 1C), therein locating this unallocated portion of GUI 114 adjacent third title 150C as depicted in FIG. 1B to define unutilized space 156.

Plugin 112 may be configured to only move certain predetermined elements of GUI 114 in certain predetermined ways to avoid interfering with one or more functions of search engine 120. For example, plugin 112 may be configured to only move elements of GUI 114 that are identified as advertisements, or plugin 112 may be configured to only move elements a threshold distance (e.g., as measured in pixels) relative to a designated position, or the like. In this way, plugin 112 may be configured to create unutilized space 156 adjacent fragments such as third title 150C such that a fragment may be provided additional text 162 to aid in a presentation of information, even if such unutilized space 156 was not designated adjacent this fragment as sent by search engine 120.

In certain examples, plugin 112 may provide additional text 162 prior to internet browser 116 loading GUI 114 for a user to view. As such, a user may first view GUI 114 of FIG. 1C, even as search engine 120 designated the GUI 114 of FIG. 1B for presentation. Put differently, plugin 112 may autonomously (e.g., without input from a user) identify that title 150C is a fragment and therein identify additional text 162 to display in unutilized space 156 adjacent graphical portion 152C allocated to the fragment. In other examples, plugin 112 may provide additional text 162 subsequent to internet browser 116 generating GUI 114 of FIG. 1B. For example, plugin 112 may provide additional text 162 in response to a prompt from user to provide all available additional text 162.

As described above, plugin 112 may include software that is configured to integrate with internet browser 116 on user device 110, though in other examples plugin 112 may function as a software-as-a-service hosted on another remote device and accessed over network 140 when utilizing search engine 120. In either example (or in other similar examples), plugin 112 may be part of a computing device. Put differently, plugin 112 may include instructions stored on a memory of a computing device that, when executed by a processor of that computing device, cause the processor to execute the operations attributed to plugin 112 herein.

Figure 2:
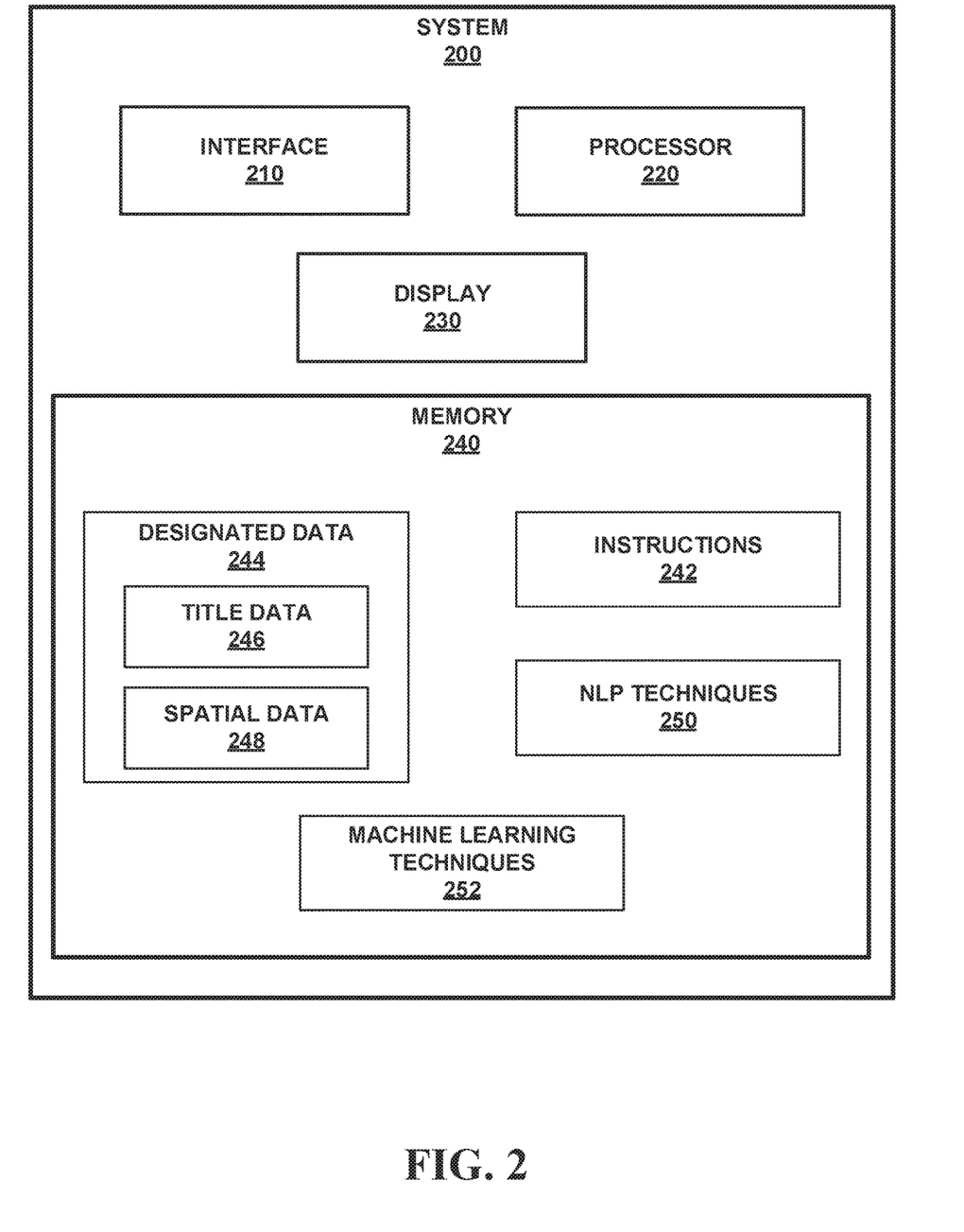
FIG. 2 depicts a conceptual box diagram of example components of a system in which plugin of FIG. 1A may manage hyperlinks.

For example, FIG. 2 depicts a conceptual box diagram of system 200 with a processor configured to execute instructions stored on a memory to execute the techniques described herein. System 200 may include interfaces 210, processor 220, display 230, and memory 240. System 200 may include any number or amount of interface(s) 210, processor(s) 220, display(s), and/or memory(s) 240.

System 200 may include components that enable plugin 112 to communicate with (e.g., send data to and receive and utilize data transmitted by) devices that are external to system 200. For example, system 200 includes interface 210 that is configured to enable system 200 and components within system 200 (e.g., such as processor 220) to communicate with entities external to system 200. Specifically, interface 210 may be configured to enable components of system to communicate with search engine 120, sources 130, or the like. Interface 210 may include one or more network interface cards, such as Ethernet cards, and/or any other types of interface devices that can send and receive information. Any suitable number of interfaces may be used to perform the described functions according to particular needs.

As discussed herein, plugin 112 is configured to manage hyperlinks by identifying fragments as sent by search engine 120 and gathering additional text 156 from respective sources 130 of those fragments to display adjacent fragmented titles 150. System 200 of plugin 112 may utilize processor 220 to thusly manage hyperlinks. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage the presentation of hyperlinks accordingly.

Hyperlinks may be managed as displayed on display 230 of system 200. Display 230 may be configured to display information in graphical (pictorial) form. Display 230 may be configured to present GUI 114 described herein. Display 230 may include a liquid crystal display (LCD) monitor, a cathode ray tube (CRT) display, or any other type of monitor.

Processor 220 may manage hyperlinks according to instructions 242 stored on memory 240 of system 200. Memory 240 may include a computer storage medium or computer-readable storage device. In some examples, memory 240 may include one or more of a short-term memory or a long-term memory. Memory 240 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage hyperlinks as described herein according to instructions 242 of one or more applications (e.g., plugin 114) stored in memory 240 of system 200.

In addition to instructions 242, in some examples gathered or predetermined data or techniques or the like as used to manage hyperlinks as described herein may be stored within memory 240. For example, memory 240 may include information described above that may be designated for display in GUI 114 as sent from search engine 120. For example, as depicted in FIG. 2, memory 240 may include designated data 244, which includes title data 246 and spatial data 248. Title data 246 may include the text of titles 150, and/or any hyperlinks to be embedded within titles 150. Spatial data 248 may include data defining a size and relative location of some or all graphical portions 152 of elements designated for display by, e.g., search engine 120. Designated data 244 may further include other data for display, such as advertisements, images, summaries, or the like. In some examples, designated data 244 may be stored in short-term memory allocated to internet browser 116, such that some or all designated data 244 is deleted when internet browser 116 is closed (or the relevant tab of internet browser 116 is closed).

Memory 240 may further include NLP techniques 250. NLP techniques 250 can include, but are not limited to, semantic similarity, syntactic analysis, and ontological matching. For example, in some embodiments, processor 220 may be configured to analyze a search query provided by a user to search engine 120 to determine semantic features (e.g., word meanings, repeated words, keywords, etc.) and/or syntactic features (e.g., word structure, location of semantic features in headings, title, etc.) of this search query. Ontological matching could be used to map semantic and/or syntactic features to a particular concept. The concept can then be used to determine the topic of the search query. In this same way, a topic of sources 130 and/or of titles 150 may be identified, such that additional text 162 that fits within unutilized space 156 may be identified. As such, using NLP techniques 250, plugin 112 may create additional text 162 to "finish" a fragment provided by search engine 120.

Memory 240 may further include machine learning techniques 252 that plugin 112 may use to improve a process of managing hyperlinks as discussed herein over time. Machine learning techniques 252 can comprise algorithms or models that are generated by performing supervised, unsupervised, or semi-supervised training on a dataset, and subsequently applying the generated algorithm or model to manage hyperlinks. For example, based on direct or indirect feedback from a user, plugin 112 may improve an ability to create additional text 162 that finishes a fragment as described herein. Specifically, plugin 112 may identify that additional text 162 was correctly created via a direct affirmative or negative response from a user (e.g., where a user clicks a button that indicates whether additional text 162 made sense). Additionally, or alternatively, plugin 112 may gather indirect feedback such as whether or not a user quickly navigates to and from sources 130 that include created additional text 162, where such quick navigation may indicate that the user was not satisfied by the created additional text 162 (and had to navigate to source 130 to further understand source 130).

In similar ways, based on direct or indirect feedback from a user, plugin 112 may improve an ability to identify (and/or create) unutilized space 156 as described herein. For example, plugin 112 may utilize machine learning techniques 252 to learn to place additional text 162 that looks more natural (e.g., more aligned with designated data 244 as sent by search engine 120) or pleasant (e.g., more appealing to users) as directly or indirectly discovered from users.

Machine learning techniques 252 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 252 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Figure 3:
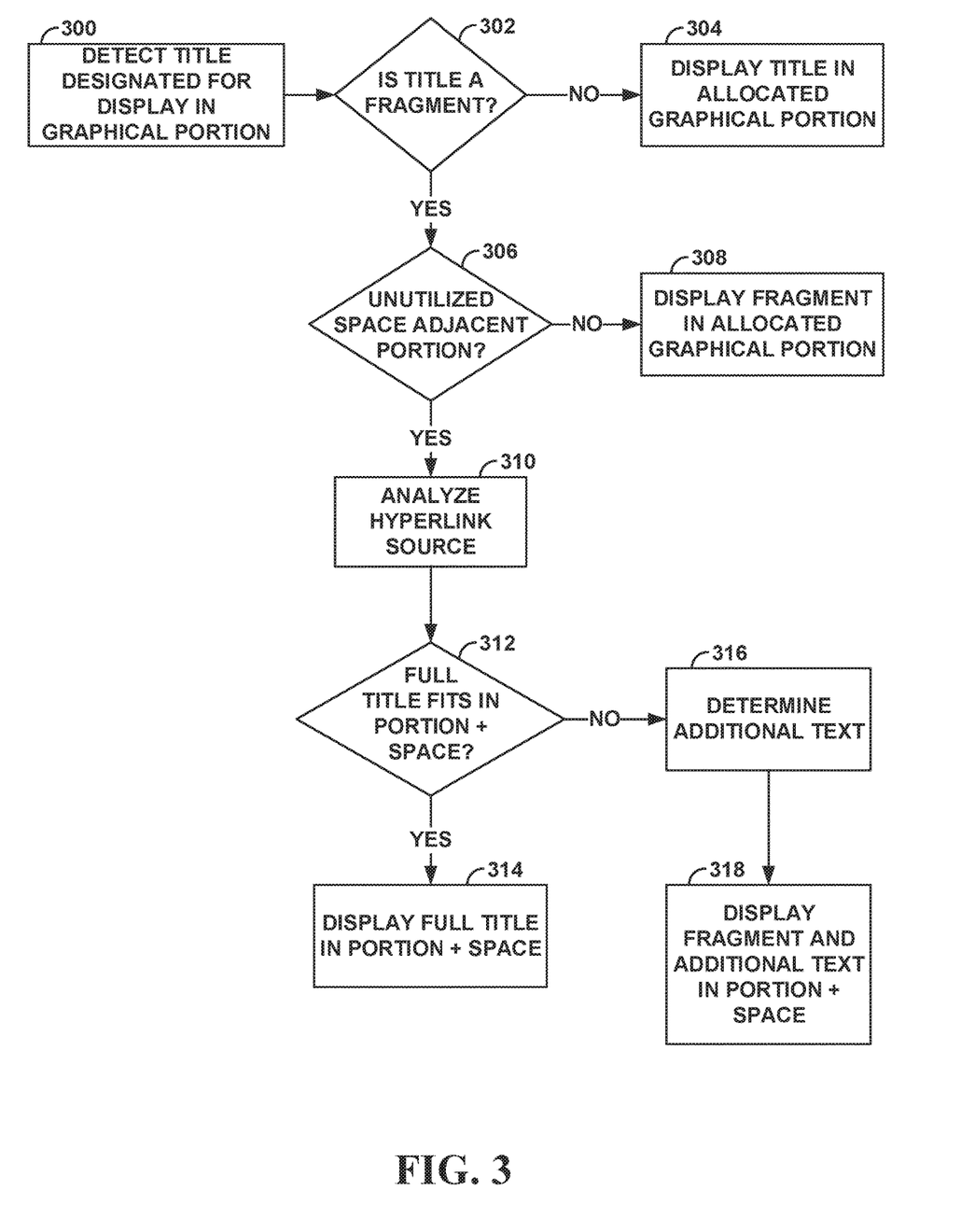
FIG. 3 depicts an example flowchart by which the plugin of FIG. 1A may manage hyperlinks on a GUI.

In this way, plugin 112 may be integrated into system 200 to manage hyperlinks by identifying additional text that can finish fragments by navigating back to a source indicated by hyperlinks. For example, plugin 112 may manage hyperlinks according to the flowchart depicted in FIG. 3. The flowchart of FIG. 3 is discussed with relation to FIGS. 1A-1C for purposes of illustration, though it is to be understood that other systems may be used to execute the flowchart of FIG. 3 in other examples. Further, in some examples plugin 112 may execute a different method than the flowchart of FIG. 3, or plugin 112 may execute a similar method with more or fewer steps in a different order, or the like.

Plugin 112 detects titles 150 designated for display (300). Each title 150 may be designated for display within a respective graphical portion that defines a size of an area and a relative position of the area in which titles 150 are to be displayed. Plugin 112 determines whether any of titles 150 are a fragment (302). Plugin 112 may determine that titles 150 include fragments as a result of an ellipsis or other identifier at the end of the respective titles 150, or through NLP techniques that identify that titles 150 do not include a clear topic. Plugin 112 may avoid updating or changing how any non-fragmented titles 150 are displayed, such that internet browser 116 displays these titles 150 as designated by search engine 120 (304). As such, plugin 112 may determine to enable internet browser 116 to display titles 150A, 150B within allocated graphical portions 152A, 152B of GUI 114 as designated by search engine 120.

Plugin 112 may determine that title 150C includes a fragment. In response to plugin 112 determining title 150C includes a fragment, plugin 112 analyzes whether or not unutilized space 156 is adjacent the respective graphical portion 152C allocated to title 150C fragment (306). In some examples, plugin 112 searches for a threshold amount of unutilized space 156, which may include a threshold amount of pixels along a vector that title 150C fragment defines (e.g., if title 150C fragment is all on a single line, plugin 112 determines if there is unutilized space 156 at the end of this single line). If no unutilized space 156 is identified, plugin 112 may display title 150C fragment in the respective allocated graphical portion 152C (308). In other examples, plugin 112 may rearrange some of the designated data (e.g., such as by moving advertisement 160) to define unutilized space 156 adjacent the relevant graphical portion 152C.

If plugin 112 identifies unutilized space 156 adjacent graphical portion 152C of title 150C fragment, plugin 112 analyzes source 130 of title 150C (310). Plugin 112 may analyze source 130 by searching source 130 for title 150C fragment. Plugin 112 may identify the full title of source 130. Plugin 112 analyzes whether or not the full title of title 150C fragment fits in the combined area of graphical portion 152C and unutilized space 156 (312). If the full title fits within the allocated graphical portion 152C and unutilized space 156, plugin 112 causes this full title to be displayed in GUI 114 (314).

If plugin 112 determines that the full title does not fit within this combined area, plugin 112 may identify additional text 162 that does fit (316). For example, plugin 112 may identify each subsequent word after title 150C fragment that fits into unutilized space 156, therein identifying these words, whatever they are, as additional text 162. In other examples, plugin 112 may utilize NLP techniques as described herein to identify additional text 162 that provides a contextual answer and response to a search query of the user while fitting within the combined area of graphical portion 152C and unutilized space 156. Once determined, plugin 112 causes additional text 162 to be displayed in unutilized space 156 (318).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, by a software plugin, that a fragment of title text of a hyperlink to a source is designated to be displayed in a graphical portion of a graphical user interface (GUI), wherein the graphical portion is allocated for the title text of the hyperlink;
   identifying, by the software plugin, a threshold amount of unutilized space on the GUI adjacent the graphical portion;
   gathering, by the software plugin, additional text of the title text from the source in response to both identifying that the fragment is designated to be displayed and identifying the threshold amount of unutilized space; and
   causing, by the software plugin, the GUI to display the additional text of the title in the unutilized space adjacent the graphical portion.

2. The computer-implemented method of claim 1, wherein
   the source is a webpage.

3. The computer-implemented method of claim 1, wherein the title is one of a plurality of titles of a plurality of hyperlinks that are displayed on the GUI as search results in response to a search query provided by a user.

4. The computer-implemented method of claim 1, wherein:
   the GUI is an internet browser GUI; and
   an online search engine accessed by the internet browser provides the fragment and defines the graphical portion.

5. The computer-implemented method of claim 1, wherein the fragment and the additional text of the title include less than all text of the title.

6. The computer-implemented method of claim 5, further comprising the software plugin utilizing natural language processing (NLP) techniques to create the additional text from the title, where the additional text was not present as a consecutive string of characters within the source.

7. The computer-implemented method of claim 1, wherein the GUI is caused to display the additional text of the title in the unutilized space adjacent the graphical portion without input from a user.

8. The computer-implemented method of claim 7, wherein the GUI is caused to display the additional text of the title in the unutilized space adjacent the graphical portion prior to the fragment being displayed adjacent the unutilized space.

9. The computer-implemented method of claim 1, further comprising the software plugin searching the source for the fragment.

10. A system comprising:
    a processor; and
    a memory in communication with the processor, the memory containing instructions that, when executed by the processor, cause the processor to:
       determine that a fragment of title text of a hyperlink to a source is designated to be displayed in a graphical portion of a graphical user interface (GUI), wherein the graphical portion is allocated for the title text of the hyperlink;
       identify a threshold amount of unutilized space on the GUI adjacent the graphical portion;
       gather additional text of the title text from the source in response to both identifying that the fragment is designated to be displayed and identifying the threshold amount of unutilized space; and
       cause the GUI to display the additional text of the title in the unutilized space adjacent the graphical portion.

11. The system of claim 10, wherein:
    the source is a webpage; and
    a plugin is configured to:
       determine the fragment is designated to be displayed;
       identify the threshold amount of unutilized space;
       gather the additional text; and
       cause the GUI to display the additional text.

12. The system of claim 10, wherein the fragment and the additional text of the title include less than all text of the title.

13. The system of claim 12, the memory further containing instructions that, when executed by the processor, cause the processor to utilize natural language processing (NLP) techniques to generate the additional text from the title, where the additional text was not present as a consecutive string of characters within the source.

14. The system of claim 10, wherein:
    the GUI is a GUI of an internet browser;
    the internet browser defines the graphical portion; and
    the internet browser is not configured to identify the threshold amount of unutilized space.

15. The system of claim 10, wherein the GUI is caused to display the additional text of the title in the unutilized space adjacent the graphical portion without input from a user prior to the fragment being displayed adjacent the unutilized space.

16. The system of claim 10, the memory further containing instructions that, when executed by the processor, cause the processor to search the source for the fragment.

17. A computer program product, the computer program product comprising a computer readable storage medium having program instructions embodied therewith, the program instructions executable by a computer to cause the computer to:
 determine that a fragment of title text of a hyperlink to a source is designated to be displayed in a graphical portion of a graphical user interface (GUI), wherein the graphical portion is allocated for the title text of the hyperlink;
 identify a threshold amount of unutilized space on the GUI adjacent the graphical portion;
 gather additional text of the title text from the source in response to both identifying that the fragment is designated to be displayed and identifying the threshold amount of unutilized space; and
 cause the GUI to display the additional text of the title in the unutilized space adjacent the graphical portion.

18. The computer program product of claim 17, wherein:
 the GUI is an internet browser GUI;
 the internet browser defines the graphical portion;
 the internet browser is not configured to identify the threshold amount of unutilized space the source is a webpage; and
 a plugin is configured to:
  determine the fragment is designated to be displayed;
  identify the threshold amount of unutilized space;
  gather the additional text; and
  cause the GUI to display the additional text.

19. The computer program product of claim 17, wherein:
 the fragment and the additional text of the title include less than all text of the title; and
 the computer readable storage medium further including program instructions that, when executed by the computer, cause the computer to utilize natural language processing (NLP) techniques to generate the additional text from the title, where the additional text was not present as a consecutive string of characters within the source.

20. The computer program product of claim 17, the computer readable storage medium further including program instructions that, when executed by the computer, cause the computer to cause the processor to search the source for the fragment.

* * * * *